Patented June 24, 1941

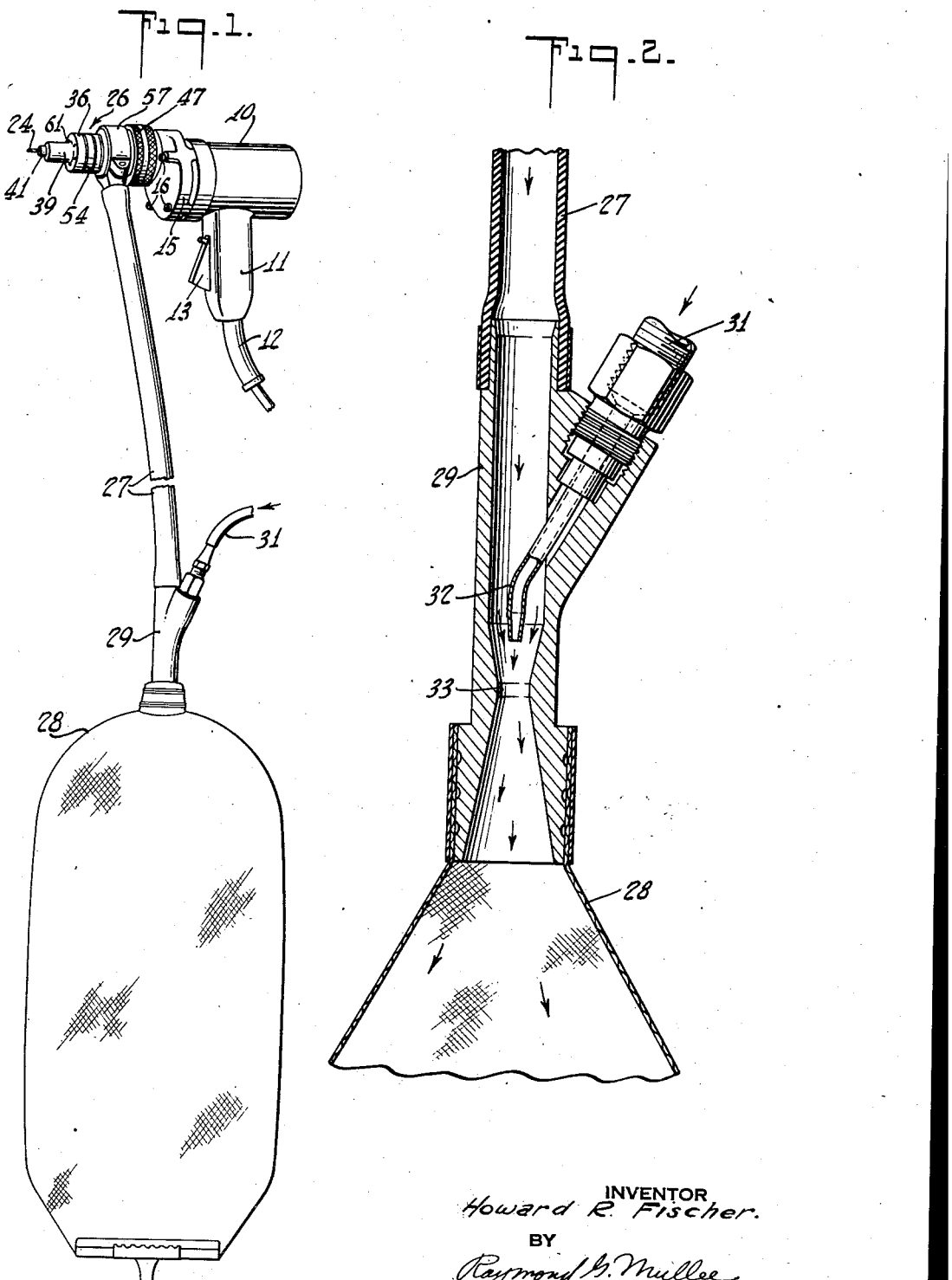

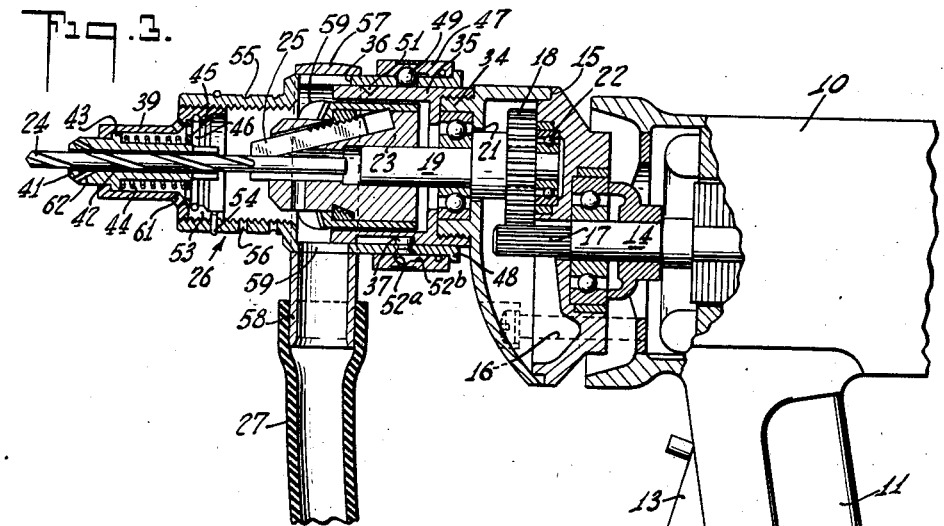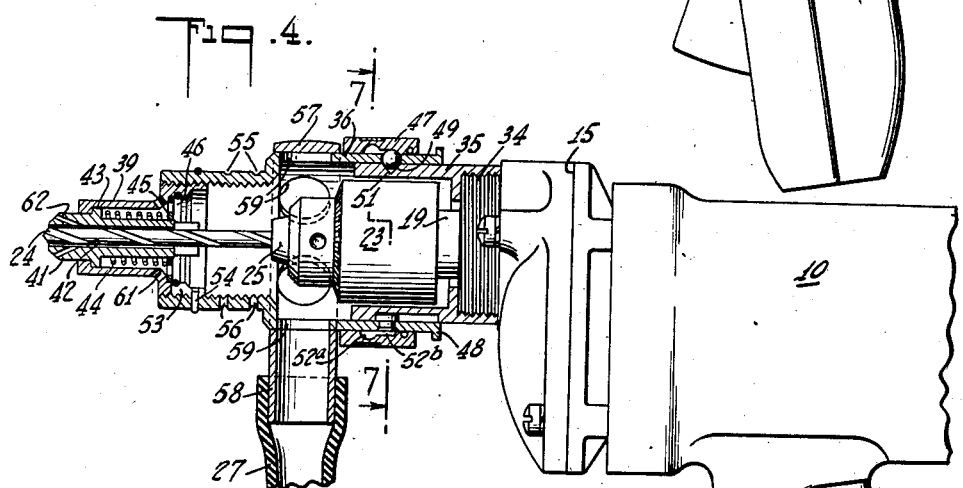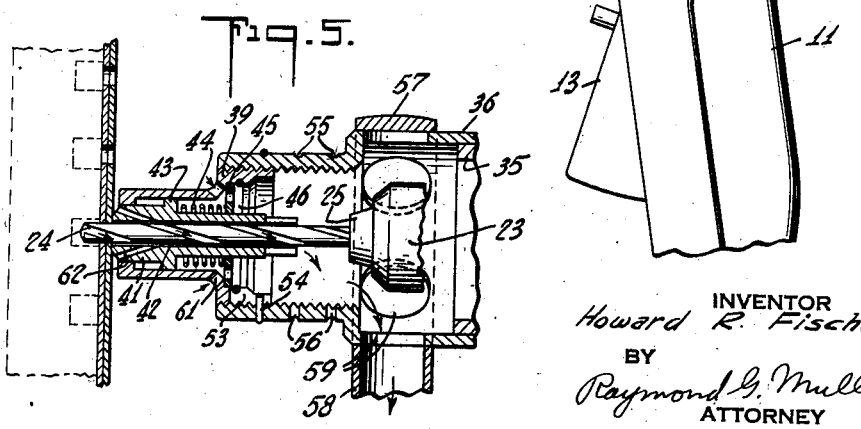

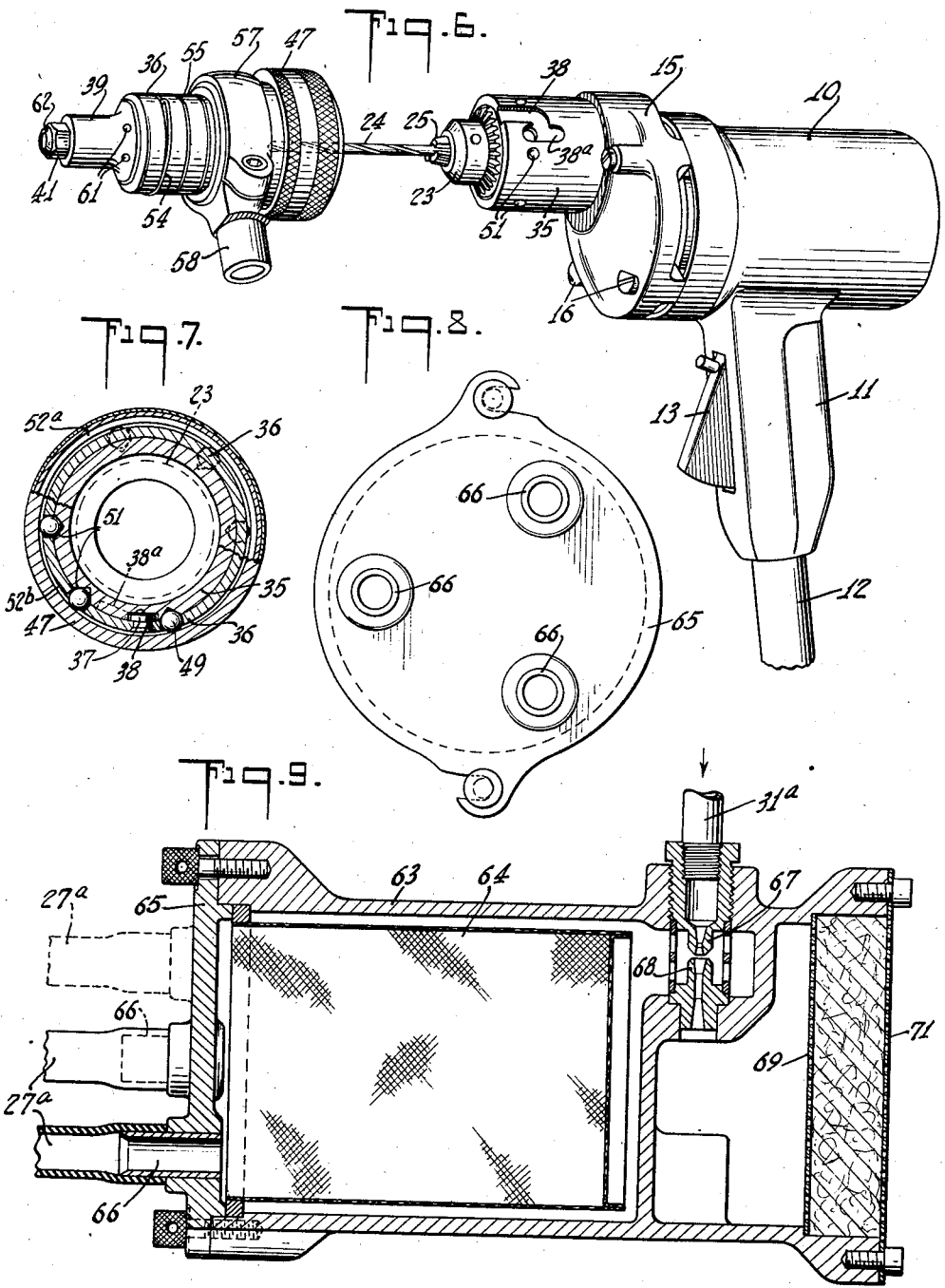

2,246,916

UNITED STATES PATENT OFFICE 2,246,916

HOLD-DOWN AND CHIP COLLECTING ATTACHMENT FOR DRILLS

Howard R. Fischer, Detroit, Mich., assignor to Chicago Pneumatic Tool Company, New York, N. Y., a corporation of New Jersey Application October 5, 1940, Serial No. 359,919

14 Claims. (Cl. 77—55)

This invention relates generally to drilling tools and more particularly to means for controlling the disposal of dust particles or chips created when drilling and reaming holes in sheet metal and like material.

In many industries, particularly the one concerned with the construction of aircraft, the incident assembly work includes the joining together, by riveting, of two or more thin sheets of light weight metal, such as aluminum. In forming the rivet holes the metal sheets are brought adjacent one another, to form in effect a single sheet, and a twist drill is driven through the laminated work at predetermined positions on the face thereof. This operation, sometimes called "multi-sheet drilling," presents a problem, however, in that dust particles and fine chips created by the drill tend to sift between the sheets and hold the adjacent surfaces thereof from firm contact with one another. When drilling a plurality of holes the dust particles collect to such an extent as to cause a decided gap between the sheets with the result that subsequently drilled aligned holes are formed with inwardly projecting peripheral burrs. Continued drilling of holes may cause a progressive increase in the spacing between the aluminum sheets as the burrs become larger when the gap increases. Thus, even though the accumulated chips be blown clear of the work at the end of the drilling operation, the uneven spaced relation of the sheets will be maintained because of the burrs.

The present invention has for its primary object the solving of this problem, and accomplishes this object through the provision of an attachment which may be fitted to a conventional drilling tool. This attachment comprises a hold-down assembly including a work engaging recipdown assembly including a work engaging reciprocable plunger adapted to press the outer sheet of the work into firm engagement with the inner sheet, during a drilling operation; and further comprises means for generating a current of air flowing from the area surrounding the point of the drill through the attachment to a remotely located dust receptacle. The hold-down plunger and the exhaust means thus cooperate in controlling the disposal of the dust particles. The former acts to prevent the particles from sifting between the sheets while the tool is pressed against the work and the latter acts to remove all particles from the drill hole before the tool is withdrawn.

Another object of the invention is to enable the hold-down assembly to be adjusted longitudinally of the drill to facilitate positioning of the drill point against the work.

Another object of the invention is to enable a plurality of attachment means to be used in conjunction with a single exhaust means and dust receptacle.

Other objects and structural details of the invention will be more apparent from the following description when read in conjunction with the accompanying drawings, wherein:

Fig. 1 is a perspective view of a drilling tool embodying the mechanism of the invention, showing a remotely located dust bag connected thereto and the exhaust means associated with the dust bag;

Fig. 2 is a detail view, in longitudinal section and enlarged with respect to Fig. 1, showing a compressed air jet device constituting the exhaust means of the illustrated embodiment of the invention;

Fig. 3 is a view of the tool shown in Fig. 1, partly in elevation and partly in longitudinal section, showing the hold-down assembly in retracted position;

Fig. 4 is a view similar to Fig. 3, showing the hold-down assembly in advanced position;

Fig. 5 is a fragmentary view, in longitudinal section, showing the front end of the hold-down assembly in engagement with the work, the drill steel being shown as having broken through both of the pair of metal sheets;

Fig. 6 is an exploded perspective view, showing the attachment means of the invention removed from the drilling tool and disclosing the manner in which it may be secured thereto;

Fig. 7 is a view, in cross section, taken substantially along the line 7—7 of Fig. 4, the drill steel spindle and associated chuck mechanism being omitted;

Fig. 8 is a view, in front elevation, of the removable connection plate of the dust receptacle of Fig. 9; and Fig. 9 is a view, in longitudinal section, of a modified form of dust receptacle which may be used in conjunction with one or a plurality of drilling tools and associated attachment means.

The invention is disclosed herein as operating in conjunction with an electrically powered, hand-held tool of a type commonly used in the aircraft industry to drill holes in adjacent metallic sheets preparatory to riveting. Referring to Figs. 1, 3, 4 and 6 the tool illustrated is seen to comprise a main housing 10, enclosing an electric motor (partly shown in Fig. 3), and a grip portion or handle 11 into which extends a cable 12 connectable at its free end to a source of electricity. Conductors within the cable 12 lead to the motor and supply current thereto under the control of a switch mechanism that includes a manually operable lever 13 pivotally mounted in the handle 11. The electric motor functions to drive a rotatable shaft 14 (see Fig. 3), the forward end of which projects from the housing 10 into a transmission case 15 rigidly supported at the front of the housing by side bolts 16. The front end of the shaft 14 is formed as a toothed pinion 17 and meshes constantly with a gear wheel 18 fixed to a spindle 19. The spindle 19 lies above and parallel to the shaft 14 and is rotatably mounted in bearings 21 and 22 within the case 15. The spindle extends forwardly through an opening in the transmission case and has keyed to its outer end a chuck 23 adapted to receive the shank of a bit or drill steel 24. The chuck 23 is of a type well known in the art and comprises a plurality of adjustable fingers 25 by which the drill steel may be gripped and caused to rotate with the chuck. In using the tool the point of the drill steel 24 is brought to bear against the work and the tool is pressed forwardly while the trigger 13 is actuated to initiate operation of the motor. The rotary motion of the motor shaft 14 is transmitted through the spindle 19 and chuck 23 to the drill 24 which is thereby driven through the work.

The mechanism of the invention constitutes an attachment which may be fitted to a tool of the class described above in order that dust and chips created by the drill may be removed from the drill hole as quickly as they are formed and before the steel is withdrawn from the work. Referring to Fig. 1 the attachment, indicated generally at 26, encloses the chuck 23 and is connected by means of a hose line 27 to a dust bag 28. The bag 28 serves as a depository for the dust and chips removed from the drill hole, the cut material being carried to the bag by a current of air flowing along the flutes of the drill steel 24 to the interior of the attachment 26 and through the hose 27 to the dust bag. To generate such a current of air there is provided a generally conventional jet device in which a stream of compressed air is directed to the bag 28 through a Venturi tube 29 connecting the hose 27 and the dust bag. A hose line 31, leading from a pressure fluid reservoir, is connected to the tube 29 and, as shown in Fig. 2, delivers air through a nozzle 32 to the interior of the tube. The inner end of the nozzle 32 curves into position just above a reduced neck 33 within the tube 29 and directs the air in a constant jet through the neck and into the bag 28. This operation, as is well known in the art, creates a partial vacuum above the nozzle 32 and thereby causes a flow of air toward the dust bag from the hose 27 and communicating areas.

The attachment 26 is removably secured to the front of the transmission case 15 and is comprised of a plurality of relatively movable units or sub-assemblies. The transmission case is formed with an outwardly facing screw-threaded flange 34 (Figs. 3 and 4) upon which is secured a tubular extension 35 acting as a fixed support for the movable parts of the attachment. Slidably mounted on the tubular support 35 is a cylindrical sleeve 36 extending forwardly of the fixed support and encircling the chuck 23 and a portion of the drill steel 24. Through the cooperation of a stud 37, in the sleeve 36, and a bayonet slot 38, in the support 35 (see also Fig. 6), the sleeve may be removed from and locked to the support in the manner usual in such connections. The sleeve is further permitted a slight longitudinal shifting movement when in locked position by reason of an elongation of the locking portion 38a of the slot 38. The forward portion of the sleeve 36 is reduced in diameter and the inner periphery thereof is threaded to receive a housing extension 39. The housing 39 encircles the drill 24 adjacent the front end thereof and supports a plunger 41 reciprocably mounted within the housing. The plunger 41 is formed with a longitudinal bore 42 through which the drill steel 24 extends and has an annular shoulder 43 on its outer periphery engageable with the inturned front end of the housing 39 to limit forward movement of the plunger. A compression spring 44, interposed between the shoulder 43 and a disc 45 at the rear of the housing 39, urges the plunger 41 forwardly, causing the front end thereof to lie normally outside the housing in position to contact the work. The disc 45 is held in position by a yielding split ring 46 pressed into a groove behind the disc. The function of the plunger 41 in multi-sheet drilling is that of a hold-down means adapted to press against the outer sheet of the work and hold it in engagement with the inner sheet. The latter may be held by the remaining parts of the airplane construction or may be pressed against a suitable backing means such as the jig shown in broken lines in Fig. 5. When pressed together the two metal sheets are drilled as a single sheet.

With the plunger 41 in the working position of Fig. 4 only the point of the drill 24 lies outside the bore 42. The front end of the drill is thus partly obscured at this time and it is desirable that a greater portion thereof be exposed when locating the point in a predetermined drilling position. Accordingly the assembly comprising sleeve 36, housing 39 and plunger 41 is shiftable longitudinally with respect to the fixed support 35 and is withdrawn from the Fig. 4 position to the Fig. 3 position preparatory to positioning the tool against the work. To facilitate such shifting movement of the assembly there is provided a knurled ring 47 surmounting the sleeve 36 and engageable with an outturned flange 48 at the rear of the sleeve to draw the assembly rearwardly. The ring 47 acts also, in cooperation with a set of balls 49, as a locking means for holding the sleeve 36 and associated parts in advanced working position. The several locking balls 49 are arranged between the ring 47 and the fixed support 35, each ball being positioned in a respective opening in the sleeve 36. The support 35 is formed with a series of detent notches 51 (see also Figs. 6 and 7) cooperative with the balls 49, while the inner periphery of the ring 47 has an annular groove comprising deeper and shallower portions 52a and 52b, which portions are brought selectively into cooperative relation with the locking balls by movement of the ring relatively to the sleeve 36. When the assembly is in advanced working position (Fig. 4) the balls 49 are aligned with the detent notches 51 and the ring 47 is set forward with the grooved portion 52b pressing the balls into the notches and thereby locking the sleeve against movement. When retracting the sleeve assembly, the ring 47 is grasped by its knurled exterior and pulled rearwardly into engagement with the flange 48. This movement of the ring brings the deeper grooved portion 52a thereof into cooperative relation with the locking balls 49 and enables the balls to be cammed upward out of the notches 51 as continued movement of the ring carries the sleeve 36 also rearwardly. When the drill has been properly located against the work, the ring 47 is moved forwardly, and, through the locking balls 49, forces the sleeve 36 also forwardly until limited by the stud 37 moving within the bayonet slot 38. As forward movement of the sleeve assembly is limited the locking balls 49 are brought to registry with the detent notches 51 and the ring 47 is permitted a slight additional forward movement relative to the sleeve. During such movement each ball 49 is pressed into its respective detent notch by the shallow grooved portion 52b and the parts again assume the working position of Fig. 4.

Since only the point of the drill 24 projects beyond the hold-down plunger 41, the plunger contacts the work almost immediately after the drill begins to rotate. As the drill cuts through the metallic sheets the main body of the tool, including the sleeve 36 and housing 39, advances relatively to the hold-down plunger with the result that the spring 44 is compressed and the plunger pressed against the work with increasing intensity. The separate work sheets are thereby held in firm engagement and the aligned drill holes formed without burrs around their adjacent edges.

It is desirable that the drill steel and hold-down plunger maintain substantially the same relation shown in Fig. 4 when the sleeve assembly is in advanced position. Therefore when the drill steel is reduced in length by wear, or replaced by a drill of different length, the housing extension 39 is adjusted within the front end of sleeve 36 properly to locate the plunger with respect to the point of the drill. In order that the housing 39 may be locked in any selected position of adjustment the inner end of the housing is formed with a slot 53 adapted to receive the inwardly projecting end of a wire clip 54 mounted on the sleeve 36. According to the position of the housing 39, the wire clip 54 is arranged in one of a plurality of spaced grooves 55, each of the grooves having a series of holes 56 through which the bent end of the clip may be inserted into the slot 53.

The previously described exhaust hose 27 is connected to the attachment 26 by a split band 57 which is clamped to the sleeve 36 and has a projecting tube 58 over which the hose 27 is slipped. The portion of sleeve 36 that is encircled by the band 57 is formed with a series of ports 59 and the band is arranged with the tube 58 aligned with one of the ports thereby to place the hose 27 in communication with the interior of the sleeve. Air is admitted within the sleeve 36 from atmosphere along the drill steel 24, and also through a set of ports 61 in the housing extension 39 and through a set of ports 62 located in the beveled front end of the plunger 41 and opening into the bore 42. Operation of the jet device of Fig. 2 tends to create a partial vacuum within the hose 27 and sleeve 36 and, accordingly, a steady stream of air is drawn into the sleeve through the above passages. The large particles of cut material are carried rearwardly by the helical flutes of the drill 24 and, after dropping into the sleeve 36, are entrained in the current of air passing through the sleeve and the hose 27 and are deposited in the bag 28. Air entering the bore 42 from the front end thereof and through the ports 62 picks up smaller chips and dust from the drill hole and the area surrounding the hole and carries them along the drill 24 to the exhaust hose 27. Referring to Fig. 5 it will be noted that with the plunger 41 pressed against the work the front end of the bore 42 is closed until the point of the drill breaks through the second work sheet. However, the set of ports 62 at the front of the plunger 41 directs a current of air along the drill steel during operation of the tool and substantially all of the dust particles are withdrawn from the drill hole by the suction of this air current. When the point of the drill breaks through the work, as in Fig. 5, the current of air from ports 62 is augmented by a flow passing directly through the drill hole with the result that all of the dust and chips still clinging to the metal are blown rearwardly to exhaust. While the drill hole is being thus thoroughly cleaned the plunger 41 continues to hold the work sheets in firm engagement and does not relax its pressure until the tool is withdrawn from the work. It is seen, therefore, that the drill chips and small metal particles are constantly being picked and exhausted, not only while the hole is drilled but also while the drill is being withdrawn from the finished hole. Ports 61 are larger than ports 62 and normally cooperate with the latter to maintain a sufficient volume of air to carry away chips of relatively large size.

When reaming a drilled hole, the cut material is composed chiefly of dust and very fine chips. Only a little of this dust is carried rearwardly by the flutes of the reamer and it is desirable that the velocity of the air current passing through the plunger 41 be increased above its normal rate of flow to speed up removal of the dust by inwardly flowing air. In a reaming operation, therefore, best results are obtained by closing the set of ports 61, in housing 39, in order that air may be admitted to the interior of sleeve 36 only through the forward set of ports 62 and through the front end of bore 42.

When a plurality of tools equipped with the attachment 26 are to be used adjacent one another the exhaust hose 27 of each tool may be connected to a common chip collector, or receptacle, which thus replaces the individual dust bags 28. A chip collector suitable for this purpose is shown in Fig. 9 and is seen to comprise a cylindrical metal container 63 within which is a wire mesh bag 64 which catches and retains the dust and chips discharged through the tool but permits the passage of air therethrough. The inlet end of the container 63 is closed by a plate 65 (see also Fig. 8) in which is mounted a plurality of tubular connectors 66 to each of which an exhaust hose 27a may be attached. The connectors 66 extend through the plate 65 and direct air from the exhaust hoses 27a into the open front end of the bag 64. In the present chip collector the Venturi vacuum tube assembly is positioned to the rear of the bag 64 and comprises spaced tubes 67 and 68, the compressed air being supplied by a hose 31a and directed in a jet across an intervening space from the tube 67 to the tube 68. To eliminate the noise of air escaping from the container 63, the outlet end thereof is provided with a muffler comprising a pair of perforated plates 69 and 71, the area between which is filled with steel wool or a similar material.

What is claimed is:

1. An assembly for drilling aligned holes in adjacent metal sheets and for controlling the disposal of dust particles created by the drilling of such holes, comprising a power driven tool having a forwardly projecting cutting drill, a work engaging hold-down plunger supported at the front end of said tool and having a central bore through which the drill steel may extend, the front end of the central bore being closed when said plunger is pressed against the work, a set of ports within said plunger opening into said central bore adjacent the front end thereof, and means for exhausting said central bore to generate a current of air flowing to said bore through said set of ports during formation of the drill hole, and concurrently through said set of ports and through the front end of the bore when the point of the drill breaks through the inner work sheet.

2. In a device of the class described, the combination of an attachment for drilling and like tools comprising a housing adapted to be mounted on the front end of the tool to encircle the drill steel, a work engaging hold-down plunger supported for reciprocable movement at the front end of said housing, said plunger having a central bore communicating the interior of said housing to atmosphere and permitting the passage of the drill steel therethrough, and means for exhausting the interior of said housing to generate a current of air flowing from the atmosphere through said central bore along said drill steel and out said housing.

3. In a device of the class described, the combination of an attachment for drilling and like tools comprising a housing adapted to be mounted on the front end of the tool to encircle the drill steel, a work engaging hold-down plunger supported for reciprocable movement at the front end of said housing, said plunger having a central bore communicating the interior of said housing to atmosphere and permitting the passage of the drill steel therethrough, means for exhausting the interior of said housing to generate a current of air flowing from the atmosphere through said central bore along said drill steel and out said housing, and means for maintaining said plunger in contact with the work during a drilling operation to enforce entrance of dust particles created by the drill into said central bore.

4. An attachment for drilling and like tools comprising a sleeve adapted to be mounted on the front end of the tool to encircle the drill steel, a work engaging hold-down plunger supported at the front end of said sleeve and having a central bore through which the drill steel may extend, means for shifting the assembly comprising said sleeve and said plunger to advanced and retracted positions relatively to said tool to expose a smaller and greater portion of the front end of the drill, means defining positively the advanced and retracted positions of said assembly, and means for locking said assembly in advanced position.

5. An attachment for drilling and like tools comprising a sleeve adapted to be mounted on the front end of the tool to encircle the drill steel and shiftable to advanced and retracted positions relatively to the tool to expose a smaller and greater portion of the front end of the drill, and means for locking said sleeve in advanced position, including a locking ring surmounting said sleeve and cooperable therewith to retract said sleeve when drawn rearwardly.

6. An attachment for drilling and like tools comprising a sleeve adapted to be mounted on the front end of the tool to encircle the drill steel and shiftable to advanced and retracted positions relatively to the tool to expose a smaller and greater portion of the front end of the drill, means for locking said sleeve in advanced position, said locking means including a manually shiftable ring surmounting said sleeve, and means cooperable with said ring and with said sleeve to advance said sleeve in response to a forward movement of said ring.

7. An attachment for drilling and like tools comprising a sleeve adapted to be mounted on the front end of the tool to encircle the drill steel and shiftable to advanced and retracted positions relatively to the tool to expose a smaller and greater portion of the front end of the drill, means for locking said sleeve in advanced position, said locking means including a plurality of fixed detents, a plurality of locking balls carried in respective openings in said sleeve and adapted to register with said detents in the advanced position of said sleeve, and a locking ring surmounting said sleeve and movable relatively thereto to press said balls into locking engagement with said detents.

8. An attachment for drilling and like tools comprising a sleeve adapted to be mounted on the front of the tool to encircle the drill steel, a tubular extension supported at the front end of said sleeve and encircling the drill steel adjacent the point thereof, means for shifting the assembly comprising said sleeve and said tubular extension to advanced and retracted positions relatively to the tool to expose a smaller and greater portion of the front end of the tool, and means for setting said tubular extension to a plurality of longitudinal positions relatively to said sleeve.

9. An attachment for drilling and like tools comprising a sleeve adapted to be mounted on the front of the tool to encircle the drill steel, a tubular extension supported at the front end of said sleeve and encircling the drill steel adjacent the point thereof, means for shifting the assembly comprising said sleeve and said tubular extension to advanced and retracted positions relatively to the tool to expose a smaller and greater portion of the front end of the tool, means for setting said tubular extension to a plurality of longitudinal positions relatively to said sleeve, means for locking said sleeve in advanced position, and means for locking said tubular extension in any one of its plurality of longitudinal positions.

10. An attachment for drilling and like tools comprising a sleeve adapted to be mounted on the front of the tool, a tubular extension supported at the front end of said sleeve and encircling the drill steel adjacent the point thereof, a work-engaging hold-down plunger reciprocable within said tubular extension, a yielding means resisting rearward movement of said plunger relatively to said tubular extension, means for shifting the assembly comprising said sleeve, said tubular extension and said plunger to advanced and retracted positions to expose a smaller and greater portion of the drill steel, and means for setting the assembly comprising said tubular extension and said plunger to a plurality of longitudinal positions relatively to said sleeve.

11. An assembly for controlling the disposal of dust particles created by the drilling of holes in sheet metal or other material, comprising a tubular attachment adapted to be mounted on the front of a drilling tool, and including a work engaging hold-down plunger having a central bore through which the drill steel may extend, said central bore communicating at its outer end with the atmosphere and at its inner end with the interior of said attachment, a dust receptacle remotely located with respect to said tool attachment and communicating with the interior thereof, and means for generating a flow of air from atmosphere inward through the central bore of said plunger to the interior of said attachment and thence to said dust receptacle.

12. An assembly for controlling the disposal of dust particles created by the drilling of holes in sheet metal and other materials, comprising a tubular attachment adapted to be mounted on the front of a drilling tool, and including means surrounding the outer end of the drill steel and engageable with the work during a drilling operation, means communicating the interior of said attachment to atmosphere, a dust receptacle remotely located with respect to said tool attachment and communicating with the interior thereof, and a compressed air jet device adjacent said dust receptacle for generating a flow of air from atmosphere through said attachment to said dust receptacle.

13. An assembly for controlling the disposal of dust particles created by the drilling of holes in sheet metal and other materials, comprising a tubular attachment adapted to be mounted on the front of a drilling tool, and including an enclosure surrounding the outer end of the drill steel, a dust receptacle remotely located with respect to said tool attachment, an exhaust hose communicating with the interior of said attachment and connected to said dust receptacle, and a compressed air jet device adjacent said dust receptacle for generating a flow of air from the interior of said attachment through said exhaust hose to said dust receptacle.

14. An assembly according to claim 13 characterized by a dust receptacle having a plurality of exhaust hose connecting means whereby one receptacle may serve as a common dust depository in association with a plurality of tool attachments.

HOWARD R. FISCHER.